US012671860B2

(12) United States Patent
He et al.

(10) Patent No.: US 12,671,860 B2
(45) Date of Patent: Jun. 30, 2026

(54) PRELOADING METHOD, ELECTRONIC DEVICE AND MEDIUM

(71) Applicant: Beijing Bytedance Network Technology Co., Ltd., Beijing (CN)

(72) Inventors: Wei He, Beijing (CN); Aoyang Zhang, Beijing (CN); Zhendong Zhong, Beijing (CN); Qian Ma, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/856,843

(22) PCT Filed: Mar. 15, 2023

(86) PCT No.: PCT/CN2023/081498
§ 371 (c)(1),
(2) Date: Oct. 14, 2024

(87) PCT Pub. No.: WO2023/197810
PCT Pub. Date: Oct. 19, 2023

(65) Prior Publication Data
US 2025/0254383 A1 Aug. 7, 2025

(30) Foreign Application Priority Data
Apr. 15, 2022 (CN) .......................... 202210399971.2

(51) Int. Cl.
*H04N 21/433* (2011.01)
(52) U.S. Cl.
CPC ............................... *H04N 21/4331* (2013.01)

(58) Field of Classification Search
None
See application file for complete search history.

(56) References Cited

U.S. PATENT DOCUMENTS

| | | |
|---|---|---|
| 9,798,827 B2 | 10/2017 | Liang |
| 10,489,476 B2 | 11/2019 | Liang |
| 2016/0216877 A1 | 7/2016 | Ekstrand et al. |
| 2018/0081984 A1* | 3/2018 | Liang ................. G06F 16/9574 |

FOREIGN PATENT DOCUMENTS

| | | |
|---|---|---|
| CN | 108270750 A | 7/2018 |
| CN | 109710448 A | 5/2019 |
| CN | 113254834 B | 10/2021 |
| CN | 110611829 B | 1/2022 |

(Continued)

OTHER PUBLICATIONS

China National Intellectual Property Administration, Notice of Allowance Issued in Application No. 202210399971.2, Oct. 22, 2024, 7 pages.

(Continued)

*Primary Examiner* — Heather R Jones
(74) *Attorney, Agent, or Firm* — Alleman Hall LLP

(57) ABSTRACT

A preloading method, an electronic device and a medium are provided. The method includes: determining a stuttering coefficient based on historical stuttering information of an application; determining a target preloading parameter based on a comparison result between the stuttering coefficient and a set threshold value; and preloading data in the application based on the target preloading parameter.

15 Claims, 3 Drawing Sheets

(56)     References Cited

FOREIGN PATENT DOCUMENTS

| | | | |
|---|---|---|---|
| CN | 114786055 | A | 7/2022 |
| CN | 112135169 | B | 11/2022 |
| CN | 112887795 | B | 4/2023 |
| CN | 110647366 | B | 8/2023 |
| CN | 114040230 | B | 3/2024 |
| CN | 113765993 | B | 5/2024 |
| CN | 113766261 | B | 6/2024 |
| CN | 113779461 | B | 9/2024 |
| CN | 114786055 | B | 11/2024 |
| IN | 495863 | A1 | 11/2018 |
| KR | 101655832 | B1 | 9/2016 |
| WO | 2017201711 | A1 | 11/2017 |
| WO | 2021077261 | A1 | 4/2021 |

OTHER PUBLICATIONS

China National Intellectual Property Administration, Office Action Issued in Application No. 202210399971.2, Feb. 7, 2024, 16 pages.
ISA China National Intellectual Property Administration, International Search Report and Written Opinion Issued in Application No. PCT/CN2023/081498, Jul. 5, 2023, WIPO, 17 pages.

* cited by examiner

Timing callback

↓

Counting the historical stuttering situation

↓

Stuttering coefficient > Danger threshold value ? —YES→ Delaying preloading time, increasing preloading number and size

NO

↓

Stuttering coefficient > Safe threshold value ? —YES→ Preloading time, and reducing preloading number and size in last time

NO

↓

Advancing preloading time, reducing preloading number and size

FIG. 3

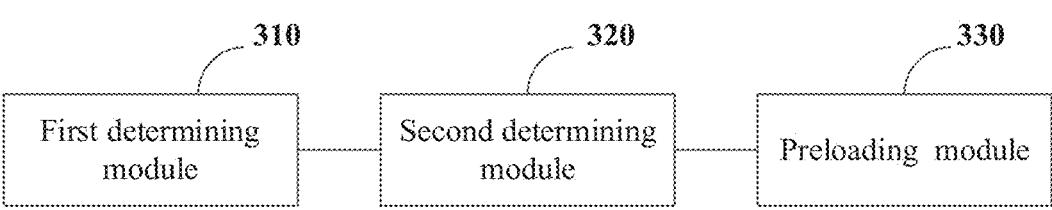

310     320     330

First determining module — Second determining module — Preloading module

FIG. 4

PRELOADING METHOD, ELECTRONIC DEVICE AND MEDIUM

CROSS-REFERENCE TO RELATED APPLICATIONS

This application is a national filing of International Patent Application No. PCT/CN2023/081498, filed on Mar. 15, 2023, which claims the priority to and benefits of Chinese Patent Application No. 202210399971.2, filed on Apr. 15, 2022. All the aforementioned patent applications are hereby incorporated by reference in their entireties.

TECHNICAL FIELD

Embodiments of the present disclosure relates to the technical field of computers, for example, to a preloading method and apparatus, an electronic device and a medium.

BACKGROUND

In order to optimize the user's experience of watching a video, the application of playing videos mainly uses a preloading method.

SUMMARY

Embodiments of the present disclosure provide a preloading method, and apparatus, an electronic device and a medium.

In the first aspect, the embodiments of the present disclosure provide a preloading method, which includes:

determining a stuttering coefficient based on historical stuttering information of an application;

determining a target preloading parameter based on a comparison result between the stuttering coefficient and a set threshold value; and preloading data in the application based on the target preloading parameter.

In the second aspect, the embodiments of the present disclosure further provide a preloading apparatus, which includes the first determining module, the second determining module and a preloading module.

The first determining module is configured to determine a stuttering coefficient based on historical stuttering information of an application.

The second determining module, is configured to determine a target preloading parameter based on a comparison result between the stuttering coefficient and a set threshold value.

The preloading module is configured to preload data in the application based on the target preloading parameter.

In the third aspect, the embodiments of the present disclosure further provide an electronic device, which includes one or more processors and a memory.

The memory is configured to store one or more programs.

The one or more programs are executed by the one or more processors, which causes the one or more processors implement the preloading method provided by the embodiments of the present disclosure.

In the fourth aspect, the embodiments of the present disclosure further provide a computer-readable medium, on which computer programs are stored. When the computer programs are executed by a processor, the preloading method provided by the embodiments of the present disclosure is implemented.

BRIEF DESCRIPTION OF DRAWINGS

Throughout the drawings, the same or similar reference numerals indicate the same or similar elements. It should be understood that the drawings are schematic, and the originals and elements are not necessarily drawn to scale.

FIG. 3 is a flow schematic diagram of a preloading method provided in the second embodiment of the present disclosure;

FIG. 4 is a structural schematic diagram of a preloading apparatus provided in the third embodiment of the present disclosure.

DETAILED DESCRIPTION

Figure 1:
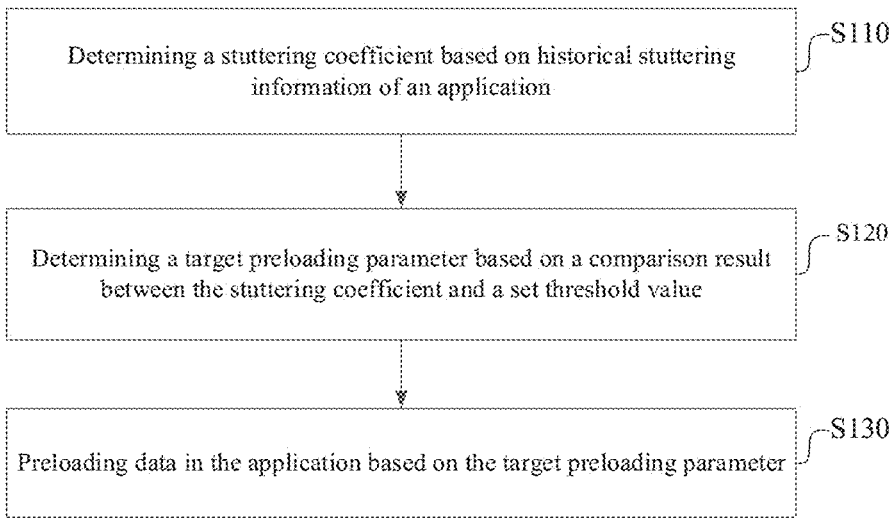
FIG. 1 is a flow schematic diagram of a preloading method provided in the first embodiment of the present disclosure.

A kind of preloading methods is to preload according to the status of a video played in a current operation, such as the length of the player-buffer, whether the download is completed or not, etc.

However, when the above-mentioned preloading methods optimize the user's experience, the above-mentioned preloading methods also bring the waste of data. There are cases where many videos are not watched by the user after being cached in advance, or the amount of data watched is much smaller than the amount of data preloaded in advance.

Considering the above-mentioned cases, the embodiments of the present disclosure provide a preloading method and apparatus, an electronic device and a medium.

The embodiments of the present disclosure are described below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of messages or information exchanged between more apparatuses in the embodiments of the present disclosure are only used for illustrative purposes, and are not used to limit the scope of these messages or information.

In the following embodiments, optional features and examples are provided in each embodiment at the same time. Various features described in the embodiments can be combined to form more embodiments, and each numbered embodiment should not be regarded as only one embodiment. In addition, the embodiments in the present disclosure and the features in the embodiments can be combined with each other without conflict.

First Embodiment

FIG. 1 is a flow schematic diagram of a preloading method provided in the first embodiment of the present disclosure. The method can preload videos. The method can be executed by a preloading apparatus, wherein the apparatus can be implemented by software and/or hardware and is generally integrated on an electronic device. The electronic device in the present embodiment includes but is not limited to a computer, a notebook computer, a tablet computer and/or a mobile phone.

It should be understood that, when a user plays a new video in the client terminal, the time consumption of the first frame may exist from the time when the user clicks a playing button until the video actually starts playing, i.e., the client needs to request video data from a server, and the video data will be rendered to the screen of the client terminal to start playing through the processes of building a connection by the Transmission Control Protocol (TCP), transmitting, decapsulating and decoding.

In order to optimize the user's viewing experience, a preloading method is mainly adopted in a kind of video playback methods, i.e., when playing a current video, the data of the subsequent video is requested to be downloaded in advance and cached locally. On the one hand, the time consumption of the first frame of subsequent video playback can be reduced, the proportion of broadcast not started can be decreased, and thus the fluency of a user watching a video is improved; on the other hand, the video can be played without network, which increases the viewing time of the user.

However, the purpose of preloading is to reduce the time consumption of the first frame and the proportion of broadcast not started. The size of preloading data in a kind of preloading methods has far exceeded the amount of the real data required for video playback, and there is a lot of data redundancy. In addition, the preloading method always does not consider the historical playback quality information, for example, a stuttering often occurs when a user is watching a video. At this time, the preloading size cannot be reduced, but the new video data is preloaded as much as possible when the network condition is good. If the stuttering has been never occurred when the user is watching the video historically, the preloading size can be reduced at this time, thereby reducing the waste of data.

Based on the content mentioned above, a preloading method provided by the first embodiment of the present disclosure includes the following steps:

S110: determining a stuttering coefficient based on historical stuttering information of an application.

The historical stuttering information may be understood as the stuttering situation when the application plays the video historically, for example, the historical stuttering information may include the stuttering number and/or the stuttering time duration. In the present embodiment, the time period of the stuttering situation characterized by the historical stuttering information is not limited, and the time period may be a specific time period or may be in the life cycle of the application. The stuttering coefficient may be used to characterize the stuttering situation of the current application.

For example, the stuttering coefficient can be determined based on the historical stuttering information of the application. The present embodiment does not limit the specific steps of determining the stuttering coefficient, for example, the stuttering coefficient may be determined according to the stuttering number in a set time period, or the stuttering coefficient may also be comprehensively determined according to the stuttering number in a long time period, the stuttering number in a recent time period (such as a set time period) and the stuttering time duration corresponding to each stuttering coefficient in a recent time period.

S120: determining a target preloading parameter based on a comparison result between the stuttering coefficient and a set threshold value.

The set threshold value may refer to a critical value preset by a system or relevant person, which is used to determine the target preloading parameter. The set threshold value may be a fixed value, and may also include the first threshold value and the second threshold value, which is not limited in the present embodiment.

The target preloading parameter may be considered as a parameter for preloading data in an application, which may include a preloading time, a preloading size and/or a preloading number, etc. The preloading time may refer to the opportunity of downloading the subsequent video in advance. The opportunity may be understood as time, and may also be understood as a condition, i.e., when reaching a certain time point or satisfying a certain condition, the subsequent video can be downloaded in advance to implement preloading, and the specific contents of the time point and condition are not limited here. For example, after starting to play the video for a set time duration, the subsequent video can be downloaded in advance; it can also be that, when the play progress of the video in a current operation played reaches two thirds, or when the number of videos that have been loaded is smaller than a set value, preloading can be performed. The set time duration and the set value may be set by a relevant person, which is not further limited here. The preloading size may be considered as the size of a preloaded video, i.e., the size of the video that needs to be downloaded in advance, for example, the preloading size may be the sum of the size of each video that needs to be downloaded in advance, or may be the size of each video. The size of each video may be one third of the total size of each video downloaded in advance. The preloading number may be understood as the number of videos that need to be downloaded in advance.

After obtaining the stuttering coefficient, the stuttering coefficient can be compared with the set threshold value to obtain a comparison result, and then the target preloading parameter can be determined according to the comparison result. For example, when the stuttering coefficient is greater than the set threshold value, the preloading time can be delayed, and the preloading number and the preloading size can be increased. For example, when the set threshold value includes the first threshold value and the second threshold value, in the case where the stuttering coefficient is greater than or equal to the first threshold value, the target preloading parameter is delaying the preloading time, and increasing the preloading number and the preloading size; in the case where the stuttering coefficient is smaller than the first threshold value and greater than the second threshold value, the target preloading parameter is a target preloading parameter determined in a last operation; in the case where the stuttering coefficient is smaller than or equal to the second threshold value, the target preloading parameter is advancing the preloading time, and reducing the preloading number and the preloading size. The present embodiment does not limit it.

S130: preloading data in the application based on the target preloading parameter.

After determining the target preloading parameter, the data in the application can be preloaded based on the target preloading parameter determined.

The first embodiment of the present disclosure provides a preloading method. The method includes: determining a stuttering coefficient based on historical stuttering information of an application; determining a target preloading parameter based on a comparison result between the stuttering coefficient and a set threshold value; and preloading data in the application based on the target preloading parameter. By using the above-mentioned method, the stuttering coefficient can be determined based on the historical stuttering information of the application, and then the target preloading parameter can be determined according to the comparison result between the stuttering coefficient and the set threshold value, thereby implementing the dynamic adjustment of the target preloading parameter, and reducing the waste rate of preloading data while implementing the optimization of the experience of viewing a video.

On the basis of the above-mentioned embodiment, variant embodiments of the above-mentioned embodiment are proposed. It should be noted here that in order to make the description brief, only the differences from the above-mentioned embodiment are described in the variant embodiments.

In an embodiment, the historical stuttering information includes the first stuttering information and the second stuttering information. The first stuttering information includes a stuttering number in a life cycle of the application, the second stuttering information includes a stuttering number and a corresponding stuttering time duration in a set time period, and the set time period is a time period of a set time duration before a current moment.

In the present embodiment, the first stuttering information may refer to the stuttering situation of the application in the life cycle. For example, the first stuttering information may include the stuttering number in the life cycle of the application. The life cycle may be understood as the whole process of the application process from the creation to the end. The present embodiment can acquire the first stuttering information in the time period from the creation of the application process to the current moment.

The second stuttering information may refer to the stuttering situation of the application in the set time period. For example, the second stuttering information may include the stuttering number and the corresponding stuttering time duration in the set time period. The set time period may be considered as a time period of a set time duration before the current moment, and the set time duration may be set by a system or relevant person, which is not limited by the present embodiment.

In an embodiment, determining a stuttering coefficient based on historical stuttering information of an application includes:

determining the first coefficient based on a statistical value of the first stuttering information;

determining the second coefficient based on a weighted value of the second stuttering information; and determining a weighted value of the first coefficient and the second coefficient as the stuttering coefficient.

In the present embodiment, the first coefficient can be considered as a stuttering coefficient determined according to the statistical value of the first stuttering information, and the second coefficient can be considered as a stuttering coefficient determined according to the weighted value of the second stuttering information. The method for determining the first coefficient and the second coefficient is not expanded in the present step. For example, the first coefficient can be determined by summing the stuttering number counted in the first stuttering information, and the second coefficient can be determined after weighting the stuttering number counted in the second stuttering information and the stuttering time duration.

For example, after determining the first coefficient based on the statistical value of the first stuttering information and determining the second coefficient based on the weighted value of the second stuttering information, the stuttering coefficient can be determined according to the weighted value of the first coefficient and the second coefficient. The weight coefficient can be determined by empirical values when weighting the first coefficient and the second coefficient, which is not limited here.

For example, the weight coefficients corresponding to different users may be different. For example, the weighted value may be the sum of a times the first coefficient and b times the second coefficient, where the values of a and b depend on the user's sensitivity to stuttering. The means for determining the sensitivity is not limited here. For example, if the user is sensitive to stuttering, the value of b can be greater than the value of a.

In an embodiment, determining the second coefficient based on a weighted value of the second stuttering information, includes:

based on the stuttering number in the second stuttering information, obtaining weighted sum of the corresponding stuttering time durations, wherein a weight coefficient of each stuttering time duration is determined based on a time stamp of the stuttering time duration; and determining a result of obtaining weighted sum as the second coefficient.

It can be understood that, when determining the second coefficient based on the weighted value of the second stuttering information, firstly, the stuttering time durations corresponding to the stuttering number can be weighted and summed based on the stuttering number in the second stuttering information. The weight coefficient of each stuttering time duration can be determined based on the time stamp of the stuttering time duration. For example, when the set time period corresponding to the second stuttering information is 5 minutes, and the stuttering occurs in the first two minutes and the first four minutes before the current moment respectively in five minutes, and each stuttering takes 30 s, the weight coefficient corresponding to the stuttering time duration of the stuttering occurs in the first two minutes can be 0.7, and the weight coefficient corresponding to the stuttering time duration of the stuttering occurs in the first four minutes can be 0.3. Then the result of obtaining weighted sum can be determined as the second coefficient.

Second Embodiment

Figure 2:
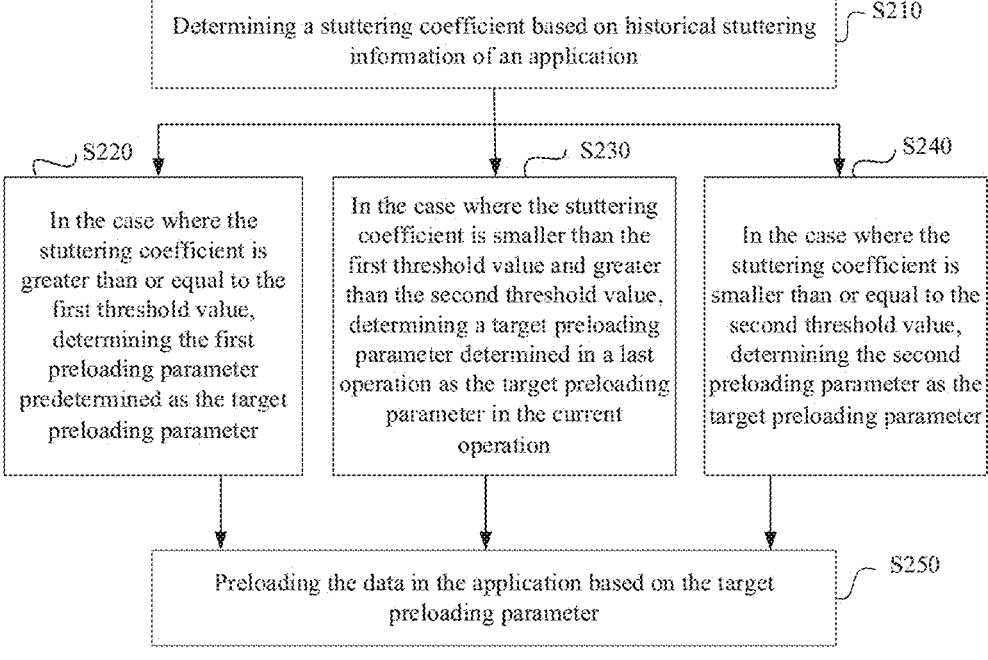
FIG. 2 is a flow schematic diagram of a preloading method provided in the second embodiment of the present disclosure.

FIG. 2 is a flow schematic diagram of a preloading method provided in the second embodiment of the present disclosure, and the present second embodiment is adjusted on the basis of each of the above-mentioned embodiments. In the present embodiment, the set threshold value includes the first threshold value and the second threshold value, the first threshold value is greater than the second threshold value, and the target preloading parameter includes a preloading time, a preloading size and a preloading number.

In an example, the present embodiment will also determine a target preloading parameter based on a comparison result between the stuttering coefficient and a set threshold value. A kind of examples is: in response to the stuttering coefficient being greater than or equal to the first threshold value, determining the first preloading parameter predetermined as the target preloading parameter; in response to the stuttering coefficient being smaller than the first threshold value and larger than the second threshold value, determining a target preloading parameter determined in a last operation as the target preloading parameter in a current operation; in response to the stuttering coefficient being smaller than or equal to the second threshold value, determining the second preloading parameter as the target preloading parameter; wherein a preloading time included in the first preloading parameter is later than a preloading time included in the second preloading parameter, a preloading size included in the first preloading parameter is greater than a preloading size included in the second preloading parameter, and a preloading number included in the first preloading parameter is greater than a preloading number included in the second preloading parameter.

The details not yet provided in the present embodiment please be referred to the first embodiment.

As illustrated in FIG. 2, a preloading method provided in the second embodiment of the present disclosure includes the following steps:

S210: determining a stuttering coefficient based on historical stuttering information of an application.

After determining the stuttering coefficient, the stuttering coefficient is compared with a set threshold value. When the set threshold value includes the first threshold value and the second threshold value, the first threshold value is greater than the second threshold value, and the target preloading parameter includes a preloading time, a preloading size and a preloading number, the preloading time, the preloading size and the preloading number in the target preloading parameter can be determined according to the comparison result.

The first threshold value may be understood as a preset danger threshold value, when the stuttering coefficient is greater than or equal to the first threshold value, the first preloading parameter can be determined as the target preloading parameter, so as to preload the data in the application according to the first preloading parameter. The second threshold value may be understood as a preset safety threshold value, when the stuttering coefficient is smaller than or equal to the second threshold value, the second preloading parameter can be determined as the target preloading parameter, so as to preload the data in the application according to the second preloading parameter. In addition, when the stuttering coefficient is smaller than the first threshold value and greater than the second threshold value, the target preloading parameter determined in the last operation can be determined as the target preloading parameter in the current operation, so as to preload the data in the application according to the target preloading parameter determined in the last operation. For example, the first threshold value may be 5, and the second threshold value may be 10.

It should be noted that the preloading time included in the first preloading parameter is later than the preloading time included in the second preloading parameter, the preloading size included in the first preloading parameter is greater than the preloading size included in the second preloading parameter, and the preloading number included in the first preloading parameter is greater than the preloading number included in the second preloading parameter.

S220: in the case where the stuttering coefficient is greater than or equal to the first threshold value, determining the first preloading parameter predetermined as the target preloading parameter, and executing step S250.

S230: in the case where the stuttering coefficient is smaller than the first threshold value and greater than the second threshold value, determining a target preloading parameter determined in a last operation as the target preloading parameter in the current operation, and executing step S250.

S240: in the case where the stuttering coefficient is smaller than or equal to the second threshold value, determining the second preloading parameter as the target preloading parameter, and executing step S250.

S250: preloading the data in the application based on the target preloading parameter.

The preloading method provided in the second embodiment of the present disclosure, by setting the first threshold value and the second threshold value, can determine the corresponding target preloading parameter according to the stuttering coefficient and the values of the first threshold value and second threshold value, and can reduce the waste rate of preloading data on the premise that the playback quality is not deteriorated.

FIG. 3 is a flow schematic diagram of a preloading method provided in the second embodiment of the present disclosure. As illustrated in FIG. 3, a timer is timed to trigger counting historical stuttering situations (i.e., historical stuttering information) in the process of playing videos. For example, the stuttering number in a long time (i.e., the first stuttering information) and the stuttering situations in a short time (i.e., the stuttering number and the stuttering durations) are counted respectively, and a stuttering coefficient is obtained by weighted calculation. When the stuttering coefficient is higher than the danger threshold value (i.e., the first threshold value), the preloading adjustment logic is triggered to delay the preloading time of subsequent video and increase the preloading number and the preloading size, and the preloading parameter pa (i.e., the first preloading parameter) is used. When the stuttering coefficient is lower than the danger threshold value but higher than the safety threshold value (i.e., the second threshold value), the preloading time, the preloading number and the preloading size decided in the last operation (i.e., the target preloading parameter determined last time) are continued. When the stuttering coefficient is lower than the safety threshold value, the preloading time is triggered in advance, the preloading number and the preloading size are reduced, and the preloading parameter pb (i.e., the second preloading parameter) is used. Therefore, the balance between the stuttering rate and the data waste can be effectively achieved by setting the safety threshold value and the danger threshold value.

Though the above description, it can be found that in order to reduce the waste of preloading data on the premise that the playback quality is not deteriorated as much as possible, the embodiment of the present disclosure introduces historical stuttering information of the process of playing videos, and sets two parameters, a safety threshold value and a danger threshold value to adjust the preloading parameter (a preloading time, a preloading number and a preloading size). The present embodiment sets two groups of fixed preloading parameters (pa, pb), which includes the preloading time, the preloading number and the preloading size.

When the stuttering coefficient obtained by calculating is greater than the danger threshold value, it indicates that the current playback quality is poor, on the one hand, the preloading time of the subsequent video needs to be delayed to ensure the playback quality of the video played in a current operation as much as possible; on the other hand, the preloading size of the subsequent video needs to be increased to delay the opportunity when the stuttering occurs in playing the subsequent video. When the stuttering coefficient is smaller than the safety threshold value, it indicates that the current playback quality is good, and the preloading number of the subsequent video can be appropriately reduced and the preloading size can be decreased to reduce the waste of preloading data, for example, the safety threshold value may be 5 and the danger threshold value may be 10, and the preloading time of the subsequent video can also be advanced.

It can be understood that, when a stuttering occurs frequently (the probability is low), i.e., the stuttering number included in the historical stuttering information is greater than the second number threshold value, the embodiment of the present disclosure can further appropriately reduce the redundancy of the preloading data, such as reducing the preloading number, decreasing the preloading size and delaying the preloading time to ensure the playback quality. When the stuttering has been never occurred (the probability is high probability), i.e., the stuttering number included in the historical stuttering information is smaller than the first number threshold value, the embodiment of the present disclosure can further increase the redundancy of preloading data, such as increasing the preloading number, increasing the preloading size, and advancing the preloading time, which can ensure the current playback quality while saving costs. On this basis, the dynamic adjustment of preloading the application is implemented, which makes the preloading method more accurate. An embodiment may be described as follows:

In an embodiment, determining a target preloading parameter based on a comparison result between the stuttering coefficient and a set threshold value, includes:

in the case where a stuttering number included in the historical stuttering information is smaller than the first number threshold value, determining a difference value between the stuttering coefficient and the second threshold value included in the set threshold value;

adjusting the second preloading parameter corresponding to the second threshold value based on the difference value, and determining the target preloading parameter, wherein a preloading time included in the target preloading parameter is earlier than a preloading time included in the second preloading parameter, a preloading number included in the target preloading parameter is greater than a preloading number included in the second preloading parameter, and a preloading size included in the target preloading parameter is greater than a preloading size included in the second preloading parameter.

The first number threshold value may be understood as the minimum critical value of the stuttering number, which can be preset by relevant personnel.

For example, when the stuttering number based on historical stuttering information is smaller than the first number threshold value, it can be considered that the probability of no stuttering occurs in the historical time period is high. At this time, the difference value between the stuttering coefficient and the second threshold value included in the set threshold value can be calculated, so that the second preloading parameter corresponding to the second threshold value is adjusted based on the difference value, so that the second preloading parameter after adjusting is determined as the target preloading parameter. It can be considered that the preloading time included in the target preloading parameter (i.e., the second preloading parameter after adjusting) is earlier than the preloading time included in the second preloading parameter, the preloading number included in the target preloading parameter is greater than the preloading number included in the second preloading parameter, and the preloading size included in the target preloading parameter is larger than the preloading size included in the second preloading parameter.

In the present embodiment, when the stuttering does not occur frequently, the target preloading parameter is dynamically adjusted, the preloading time is advanced, the preloading number is increased and/or the preloading size is increased, so as to improve the video playback quality.

In an embodiment, determining a target preloading parameter based on a comparison result between the stuttering coefficient and a set threshold, includes:

in the case where a stuttering number included in the historical stuttering information is greater than the second number threshold value, determining a difference value between the stuttering coefficient and the first threshold value included in the set threshold value;

adjusting the first preloading parameter corresponding to the first threshold value based on the difference value, and determining the target preloading parameter, wherein a preloading time included in the target preloading parameter is later than a preloading time included in the first preloading parameter, a preloading number included in the target preloading parameter is smaller than a preloading number included in the first preloading parameter, and a preloading size included in the target preloading parameter is smaller than a preloading size included in the first preloading parameter.

The second number threshold value may be understood as the maximum critical value of the stuttering number, which can be preset by relevant personnel.

For example, when the stuttering number based on historical stuttering information is greater than the second number threshold value, it can be considered that the stuttering occurs frequently in the historical time period. At this time, the difference value between the stuttering coefficient and the first threshold value included in the set threshold value can be calculated to adjust the first preloading parameter corresponding to the first threshold value based on the difference value, so that the first preloading parameter after adjusting is determined as the target preloading parameter. It can be considered that the preloading time included in the target preloading parameter (i.e., the first preloading parameter after adjusting) is later than the preloading time included in the first preloading parameter, and the preloading number included in the target preloading parameter is smaller than the preloading number included in the first preloading parameter, and the preloading size included in the target preload parameter is smaller than the preloading size included in the first preloading parameter.

In the present embodiment, when the stuttering occurs frequently, the target preloading parameter is dynamically adjusted, the preloading time is delayed, the preloading number is reduced and/or the preloading size is reduced, so as to reduce the probability of stuttering.

The following is an exemplary description of dynamically adjusting the preloading method:

Firstly, a stuttering coefficient is determined. The stuttering coefficient can be formed by two parts. The first part is a stuttering number of a video played by the user this time (calculated from starting to watch the video when opening the app, i.e., the life cycle of the application). The second part is a stuttering situation (such as the stuttering number and the corresponding stuttering time durations) in the recent time period obtained by counting in a specific time window (such as 5 minutes, i.e., the set time period), and the final stuttering coefficient is obtained by weighting two values (i.e., the first coefficient and the second coefficient)

Then, a safety threshold value (i.e., the second threshold value) and a danger threshold value (i.e., the first threshold value) are set. A player (i.e., an electronic device that installs the application) can adjust the target preloading parameter (the preloading time, the preloading number and the preloading size) according to the difference value between the stuttering coefficient and the two threshold values. That is, in the case where the stuttering number included in the historical stuttering information is greater than the second number threshold value, the difference value between the stuttering coefficient and the first threshold value is determined, and the first preloading parameter corresponding to the first threshold value is adjusted based on the difference value; in the case where the stuttering number included in the historical stuttering information is smaller than the first number threshold value, the difference value between the stuttering coefficient and the second threshold value is determined, and the second preloading parameter corresponding to the second threshold value is adjusted based on the difference value, so as to determine the target preloading parameter. Therefore, the embodiment of the present disclosure avoids the situation where the waste rate of preloading data is high, and reduces the waste of preloading data on the premise that the playback quality is not deteriorated as much as possible.

The embodiment of the present disclosure can calculate the theoretical maximum and minimum benefits based on data analysis. On the one hand, the preloading size of all videos is reduced from 800 KB to 600 KB, which makes the preloading cost decreased by 25% and the total bandwidth cost decreased by about 1%. On the other hand, as long as the stuttering occurs in the process of the user playing videos, the preloading size is restored to 800 KB. According to the current stuttering penetration rate of 35%, even if the penetration rate rises to 38.5% caused by preloading 600

KB, there is 61.5% of the video preloading size decreased, the preloading cost can be decreased by 15%, and the total bandwidth cost can be decreased by about 0.6%.

Third Embodiment

FIG. 4 is a structural schematic diagram of a preloading apparatus provided in the third embodiment of the present disclosure. The apparatus can preload videos. The apparatus may be implemented by software and/or hardware, and is generally integrated on an electronic device.

As illustrated in FIG. 4, the apparatus includes the first determining module 310, the second determining module 320 and a preloading module 330.

The first determining module 310 is configured to determine a stuttering coefficient based on historical stuttering information of an application.

The second determining module 320 is configured to determine a target preloading parameter based on a comparison result between the stuttering coefficient and a set threshold value.

The preloading module 330 is configured to preload data in the application based on the target preloading parameter.

In the present embodiment, the apparatus determines the stuttering coefficient based on the historical stuttering information of the application through the first determining module 310; determines the target preloading parameter based on the comparison result of the stuttering coefficient and the set threshold value through the second determining module 320; and preloads the data in the application based on the target preloading parameter through the preloading module 330. By using the apparatus, the stuttering coefficient can be determined based on the historical stuttering information of the application, and then the target preloading parameter can be determined according to the comparison result between the stuttering coefficient and the set threshold value, thereby implementing the dynamic adjustment of the target preloading parameter, and reducing the waste rate of preloading data while implementing the optimization of the experience of viewing a video.

In an embodiment, the historical stuttering information includes the first stuttering information and the second stuttering information, the first stuttering information includes a stuttering number in a life cycle of the application, the second stuttering information includes both a stuttering number and corresponding stuttering time durations in a set time period, and the set time period is a time period of a set time duration before a current moment.

In an embodiment, the first determining module 310 includes the first coefficient determining unit, the second coefficient determining unit and a stuttering coefficient determining unit.

The first coefficient determining unit is configured to determine the first coefficient based on a statistical value of the first stuttering information.

The second coefficient determining unit is configured to determine the second coefficient based on a weighted value of the second stuttering information.

The stuttering coefficient determining unit is configured to determine a weighted value of the first coefficient and the second coefficient as the stuttering coefficient.

In an embodiment, the second coefficient determining unit is configured to:

based on the stuttering number in the second stuttering information, obtain weighted sum of the corresponding stuttering time durations, wherein a weight coefficient of each stuttering time duration is determined based on a time stamp of the stuttering time duration; and determine a result of obtaining weighted sum as the second coefficient;

In an embodiment, the set threshold value includes the first threshold value and the second threshold value, the first threshold value is greater than the second threshold value, and the target preloading parameter includes a preloading time, a preloading size and a preloading number. Accordingly, the second determining module 320 is configured to:

in the case where the stuttering coefficient is greater than or equal to the first threshold value, determine the first preloading parameter predetermined as the target preloading parameter;

in the case where the stuttering coefficient is smaller than the first threshold value and larger than the second threshold value, determine a target preloading parameter determined in a last operation as the target preloading parameter in a current operation;

in the case where the stuttering coefficient is smaller than or equal to the second threshold value, determine the second preloading parameter as the target preloading parameter;

wherein a preloading time included in the first preloading parameter is later than a preloading time included in the second preloading parameter, a preloading size included in the first preloading parameter is greater than a preloading size included in the second preloading parameter, and a preloading number included in the first preloading parameter is greater than a preloading number included in the second preloading parameter.

In an embodiment, the second determining module 320 is configured to:

in the case where a stuttering number included in the historical stuttering information is smaller than the first number threshold value, determine a difference value between the stuttering coefficient and the second threshold value included in the set threshold value;

adjust the second preloading parameter corresponding to the second threshold value based on the difference value, and determine the target preloading parameter, wherein a preloading time included in the target preloading parameter is earlier than a preloading time included in the second preloading parameter, a preloading number included in the target preloading parameter is greater than a preloading number included in the second preloading parameter, and a preloading size included in the target preloading parameter is greater than a preloading size included in the second preloading parameter.

In an embodiment, the second determining module 320 is configured to:

in the case where a stuttering number included in the historical stuttering information being greater than the second number threshold value, determine a difference value between the stuttering coefficient and the first threshold value included in the set threshold value;

adjust the first preloading parameter corresponding to the first threshold value based on the difference value, and determine the target preloading parameter, wherein a preloading time included in the target preloading parameter is later than a preloading time included in the first preloading parameter, a preloading number included in the target preloading parameter is smaller than a preloading number included in the first preloading parameter, and a preloading size included in the target preloading parameter is smaller than a preloading size included in the first preloading parameter.

The above-mentioned preloading apparatus can execute the preloading method provided by any embodiment of the present disclosure, and has functional modules and beneficial effects corresponding to execute the method.

Fourth Embodiment

Figure 5:
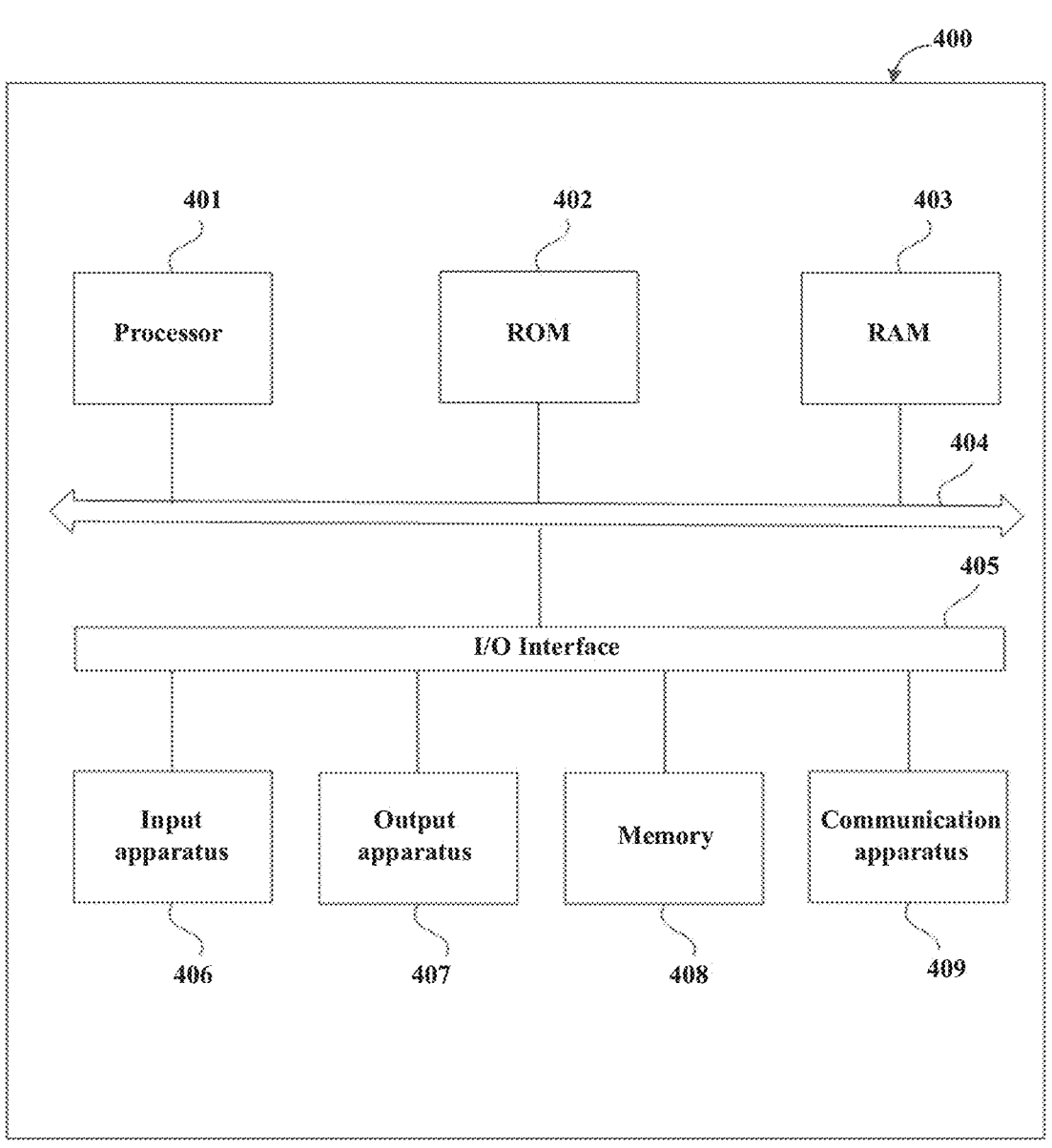
FIG. 5 is a structural schematic diagram of an electronic device provided in the fourth embodiment of the present disclosure.

FIG. 5 is a structural schematic diagram of an electronic device provided in the fourth embodiment of the present disclosure. FIG. 5 illustrates a structural schematic diagram of an electronic device 400 that is suitable to implement the embodiments of the present disclosure. The electronic device 400 in the embodiment of the present disclosure may include but not be limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The electronic device 400 shown in FIG. 5 is only an example and should not impose any limitations on the functions and use scopes of the embodiments of the present disclosure.

As shown in FIG. 5, an electronic device 400 may include a processor (such as a central processing unit, and a graphics processor) 401, it may execute various appropriate actions and processes according to a program stored in a read-only memory (ROM) 402 or a program loaded from a memory 408 to a random access memory (RAM) 403. In RAM 403, various programs and data required for operations of the electronic device 400 are also stored. The processor 401, ROM 402, and RAM 403 are connected to each other by a bus 404. An input/output (I/O) interface 405 is also connected to the bus 404.

Generally, the following apparatuses may be connected to the I/O interface 405: an input apparatus 406 such as a touch screen, a touchpad, a keyboard, a mouse, a camera, a microphone, an accelerometer, and a gyroscope; an output apparatus 407 such as a liquid crystal display (LCD), a loudspeaker, and a vibrator; a memory 408 such as a magnetic tape, and a hard disk drive; and a communication apparatus 409. The communication apparatus 409 may allow the electronic device 400 to wireless-communicate or wire-communicate with other devices so as to exchange data. Although FIG. 5 shows the electronic device 400 with various apparatuses, it should be understood that it is not required to implement or possess all the apparatuses shown. Alternatively, it may implement or possess the more or less apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 409, or installed from the memory 408, or installed from ROM 402. When the computer program is executed by the processor 401, the above functions defined in the method of the embodiment of the present disclosure are performed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any in a current operation known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any in a current operation known or future-developed networks.

The above-mentioned computer-readable medium may be included in the above-mentioned electronic device 400; or may exist alone without being assembled into the electronic device 400.

The above-mentioned computer-readable medium stores one or more computer programs, and when the one or more programs are executed by a processor, the following method is implemented:

determining a stuttering coefficient based on historical stuttering information of an application;

determining a target preloading parameter based on a comparison result between the stuttering coefficient and a set threshold value; and preloading data in the application based on the target preloading parameter.

The storage medium may be a non-transitory storage medium.

The computer-readable medium carries one or more programs, when the one or more programs are executed by the electronic device, the electronic device 400 is cause to: write the computer program code for executing the operation of the present disclosure in one or more programming languages or combinations thereof. The above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, example 1 provides a preloading method, which includes:

determining a stuttering coefficient based on historical stuttering information of an application;

determining a target preloading parameter based on a comparison result between the stuttering coefficient and a set threshold value; and preloading data in the application based on the target preloading parameter.

According to one or more embodiments of the present disclosure, in example 2 according to the method of example 1, the historical stuttering information includes the first stuttering information and the second stuttering information, the first stuttering information includes a stuttering number in a life cycle of the application, the second stuttering information includes both a stuttering number and corresponding stuttering time durations in a set time period, and the set time period is a time period of a set time duration before a current moment.

According to one or more embodiments of the present disclosure, in example 3 according to the method of example 2, determining a stuttering coefficient based on historical stuttering information of an application, includes:

determining the first coefficient based on a statistical value of the first stuttering information;

determining the second coefficient based on a weighted value of the second stuttering information;

determining a weighted value of the first coefficient and the second coefficient as the stuttering coefficient.

According to one or more embodiments of the present disclosure, in example 4 according to the method of example 3, determining a second coefficient based on a weighted value of the second stuttering information, includes:

based on the stuttering number in the second stuttering information, obtaining weighted sum of the corresponding stuttering time durations, wherein a weight coefficient of each stuttering time duration is determined based on a time stamp of the stuttering time duration;

determining a result of obtaining weighted sum as the second coefficient.

According to one or more embodiments of the present disclosure, in example 5 according to the method of example 1, the set threshold value includes the first threshold value and the second threshold value, the first threshold value is greater than the second threshold value, and the target preloading parameter includes a preloading time, a preloading size and a preloading number, correspondingly, determining a target preloading parameter based on a comparison result between the stuttering coefficient and a set threshold value, includes:

in the case where the stuttering coefficient is greater than or equal to the first threshold value, determining the first preloading parameter predetermined as the target preloading parameter;

in the case where the stuttering coefficient is smaller than the first threshold value and larger than the second threshold value, determining a target preloading parameter determined in a last operation as the target preloading parameter in a current operation;

in the case where the stuttering coefficient is smaller than or equal to the second threshold value, determining the second preloading parameter as the target preloading parameter;

wherein a preloading time included in the first preloading parameter is later than a preloading time included in the second preloading parameter, a preloading size included in the first preloading parameter is greater than a preloading size included in the second preloading parameter, and a preloading number included in the first preloading parameter is greater than a preloading number included in the second preloading parameter.

According to one or more embodiments of the present disclosure, in example 6 according to the method of example 1, determining a target preloading parameter based on a comparison result between the stuttering coefficient and a set threshold value, includes:

in the case where a stuttering number included in the historical stuttering information is smaller than the first number threshold value, determining a difference value between the stuttering coefficient and the second threshold value included in the set threshold value;

adjusting the second preloading parameter corresponding to the second threshold value based on the difference value, and determining the target preloading parameter, wherein a preloading time included in the target preloading parameter is earlier than a preloading time included in the second preloading parameter, a preloading number included in the target preloading parameter is greater than a preloading number included in the second preloading parameter, and a preloading size included in the target preloading parameter is greater than a preloading size included in the second preloading parameter.

According to one or more embodiments of the present disclosure, in example 7 according to the method of example 1, determining a target preloading parameter based on a comparison result between the stuttering coefficient and a set threshold, includes:

in the case where a stuttering number included in the historical stuttering information is greater than the second number threshold value, determining a difference value between the stuttering coefficient and the first threshold value included in the set threshold value;

adjusting the first preloading parameter corresponding to the first threshold value based on the difference value, and determining the target preloading parameter, wherein a preloading time included in the target preloading parameter is later than a preloading time included in the first preloading parameter, a preloading number included in the target preloading parameter is smaller than a preloading number included in the first preloading parameter, and a preloading size included in the target preloading parameter is smaller than a preloading size included in the first preloading parameter.

According to one or more embodiments of the present disclosure, example 8 provides a preloading apparatus, which includes the first determining module, the second determining module and a preloading module.

The first determining module is configured to determine a stuttering coefficient based on historical stuttering information of an application.

The second determining module is configured to determine a target preloading parameter based on a comparison result between the stuttering coefficient and a set threshold value.

The preloading module is configured to preload data in the application based on the target preloading parameter.

According to one or more embodiments of the present disclosure, example 9 provides an electronic device, which includes:

one or more processing devices;

a storage device, which is configured to store one or more programs;

when the one or more programs are executed by the one or more processors, causing the one or more processors to implement the method of any one of examples 1 to 7.

According to one or more embodiments of the present disclosure, example 10 provides a computer-readable medium, the computer-readable medium stores computer programs, when the computer programs are executed by a processor, implementing the method of any one of examples 1 to 7.

It should be understood by those skilled in the art that, the disclosure scope involved in the present disclosure is not limited to the embodiments formed by the specific combination of the above technical features, but also covers other embodiments formed by any combination of the above technical features or their equivalent features without departing from the above disclosure concept. For example, the embodiments are formed by the substitution of the above features with (but not limited to) technical features with similar functions disclosed in the present disclosure In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A preloading method, comprising:

determining a stuttering coefficient based on historical stuttering information of an application;

determining a target preloading parameter based on a comparison result between the stuttering coefficient and a set threshold value; and preloading data in the application based on the target preloading parameter, wherein the set threshold value comprises a first threshold value and a second threshold value, the first threshold value is greater than the second threshold value, and the target preloading parameter comprises a preloading time, a preloading size, and a preloading number, and the determining a target preloading parameter based on a comparison result between the stuttering coefficient and a set threshold value comprises:

in response to the stuttering coefficient being smaller than the first threshold value and larger than the second threshold value, determining the target preloading parameter determined in a last operation as the target preloading parameter in a current operation.

2. The method according to claim 1, wherein the historical stuttering information comprises first stuttering information and second stuttering information, the first stuttering information comprises a stuttering number in a life cycle of the application, the second stuttering information comprises both a stuttering number and corresponding stuttering time durations in a set time period, and the set time period is a time period of a set time duration before a current moment.

3. The method according to claim 2, wherein the determining a stuttering coefficient based on historical stuttering information of an application, comprises:

determining a first coefficient based on a statistical value of the first stuttering information;

determining a second coefficient based on a weighted value of the second stuttering information; and determining a weighted value of the first coefficient and the second coefficient as the stuttering coefficient.

4. The method according to claim 3, wherein the determining a second coefficient based on a weighted value of the second stuttering information, comprises:

based on the stuttering number in the second stuttering information, obtaining weighted sum of the corresponding stuttering time durations, wherein a weight coefficient of each stuttering time duration is determined based on a time stamp of the stuttering time duration;

determining a result of obtaining weighted sum as the second coefficient.

5. The method according to claim 1, wherein the determining a target preloading parameter based on a comparison result between the stuttering coefficient and a set threshold value further comprises:

in response to the stuttering coefficient being greater than or equal to the first threshold value, determining a first preloading parameter predetermined as the target preloading parameter, and in response to the stuttering coefficient being smaller than or equal to the second threshold value, determining a second preloading parameter as the target preloading parameter, wherein the preloading time comprised in the first preloading parameter is later than the preloading time comprised in the second preloading parameter, the preloading size comprised in the first preloading parameter is greater than the preloading size comprised in the second preloading parameter, and the preloading number comprised in the first preloading parameter is greater than the preloading number comprised in the second preloading parameter.

6. The method according to claim 1, wherein the determining a target preloading parameter based on a comparison result between the stuttering coefficient and a set threshold value, comprises:

in response to a stuttering number comprised in the historical stuttering information being smaller than a first number threshold value, determining a difference value between the stuttering coefficient and the second threshold value comprised in the set threshold value; and adjusting a second preloading parameter corresponding to the second threshold value based on the difference value, and determining the target preloading parameter, wherein the preloading time comprised in the target preloading parameter is earlier than the preloading time comprised in the second preloading parameter, the preloading number comprised in the target preloading parameter is greater than the preloading number comprised in the second preloading parameter, and the preloading size comprised in the target preloading parameter is greater than the preloading size comprised in the second preloading parameter.

7. The method according to claim 1, wherein the determining a target preloading parameter based on a comparison result between the stuttering coefficient and a set threshold, comprises:

in response to a stuttering number comprised in the historical stuttering information being greater than a second number threshold value, determining a difference value between the stuttering coefficient and the first threshold value comprised in the set threshold value; and adjusting a first preloading parameter corresponding to the first threshold value based on the difference value, and determining the target preloading parameter, wherein the preloading time comprised in the target preloading parameter is later than the preloading time comprised in the first preloading parameter, the preloading number comprised in the target preloading parameter is smaller than the preloading number comprised in the first preloading parameter, and the preloading size comprised in the target preloading parameter is smaller than the preloading size comprised in the first preloading parameter.

8. An electronic device, comprising:

one or more processors;

a memory, configured to store one or more programs;

when the one or more programs are executed by the one or more processors, causing the one or more processors to implement a preloading method, wherein the preloading method comprises:

determining a stuttering coefficient based on historical stuttering information of an application;

determining a target preloading parameter based on a comparison result between the stuttering coefficient and a set threshold value; and preloading data in the application based on the target preloading parameter, wherein the set threshold value comprises a first threshold value and a second threshold value, the first threshold value is greater than the second threshold value, and the target preloading parameter comprises a preloading time, a preloading size, and a preloading number, and the determining a target preloading parameter based on a comparison result between the stuttering coefficient and a set threshold value comprises:

in response to the stuttering coefficient being smaller than the first threshold value and larger than the second threshold value, determining the target preloading parameter determined in a last operation as the target preloading parameter in a current operation.

9. The electronic device according to claim 8, wherein the historical stuttering information comprises first stuttering information and second stuttering information, the first stuttering information comprises a stuttering number in a life cycle of the application, the second stuttering information comprises both a stuttering number and corresponding stuttering time durations in a set time period, and the set time period is a time period of a set time duration before a current moment.

10. The electronic device according to claim 9, wherein the determining a stuttering coefficient based on historical stuttering information of an application, comprises:

determining a first coefficient based on a statistical value of the first stuttering information;

determining a second coefficient based on a weighted value of the second stuttering information; and determining a weighted value of the first coefficient and the second coefficient as the stuttering coefficient.

11. The electronic device according to claim 10, wherein the determining a second coefficient based on a weighted value of the second stuttering information, comprises:

based on the stuttering number in the second stuttering information, obtaining weighted sum of the corresponding stuttering time durations, wherein a weight coefficient of each stuttering time duration is determined based on a time stamp of the stuttering time duration;

determining a result of obtaining weighted sum as the second coefficient.

12. The electronic device according to claim 8, wherein the determining a target preloading parameter based on a comparison result between the stuttering coefficient and a set threshold value further comprises:

in response to the stuttering coefficient being greater than or equal to the first threshold value, determining a first preloading parameter predetermined as the target preloading parameter; and in response to the stuttering coefficient being smaller than or equal to the second threshold value, determining a second preloading parameter as the target preloading parameter, wherein the preloading time comprised in the first preloading parameter is later than the preloading time comprised in the second preloading parameter, the preloading size comprised in the first preloading parameter is greater than the preloading size comprised in the second preloading parameter, and the preloading number comprised in the first preloading parameter is greater than the preloading number comprised in the second preloading parameter.

13. The electronic device according to claim 8, wherein the determining a target preloading parameter based on a comparison result between the stuttering coefficient and a set threshold value, comprises:

in response to a stuttering number comprised in the historical stuttering information being smaller than a first number threshold value, determining a difference value between the stuttering coefficient and the second threshold value comprised in the set threshold value; and adjusting a second preloading parameter corresponding to the second threshold value based on the difference value, and determining the target preloading parameter, wherein the preloading time comprised in the target preloading parameter is earlier than the preloading time comprised in the second preloading parameter, the preloading number comprised in the target preloading parameter is greater than the preloading number comprised in the second preloading parameter, and the preloading size comprised in the target preloading parameter is greater than the preloading size comprised in the second preloading parameter.

14. The electronic device according to claim 8, wherein the determining a target preloading parameter based on a comparison result between the stuttering coefficient and a set threshold, comprises:

in response to a stuttering number comprised in the historical stuttering information being greater than a second number threshold value, determining a difference value between the stuttering coefficient and the first threshold value comprised in the set threshold value; and adjusting a first preloading parameter corresponding to the first threshold value based on the difference value, and determining the target preloading parameter, wherein the preloading time comprised in the target preloading parameter is later than the preloading time comprised in the first preloading parameter, the preloading number comprised in the target preloading parameter is smaller than the preloading number comprised in the first preloading parameter, and the preloading size comprised in the target preloading parameter is smaller than the preloading size comprised in the first preloading parameter.

15. A non-transitory computer-readable medium, wherein the non-transitory computer-readable medium stores computer programs, when the computer programs are executed by a processor, implementing a preloading method, wherein the preloading method comprises:

determining a stuttering coefficient based on historical stuttering information of an application;

determining a target preloading parameter based on a comparison result between the stuttering coefficient and a set threshold value; and preloading data in the application based on the target preloading parameter, wherein the set threshold value comprises a first threshold value and a second threshold value, the first threshold value is greater than the second threshold value, and the target preloading parameter comprises a preloading time, a preloading size and a preloading number, and the determining a target preloading parameter based on a comparison result between the stuttering coefficient and a set threshold value comprises:

in response to the stuttering coefficient being smaller than the first threshold value and larger than the second threshold value, determining the target preloading parameter determined in a last operation as the target preloading parameter in a current operation.

* * * * *